Sept. 4, 1934. C. WILHJELM Re. 19,308
VALVE REGULATING DEVICE
Original Filed March 16, 1929 2 Sheets-Sheet 1
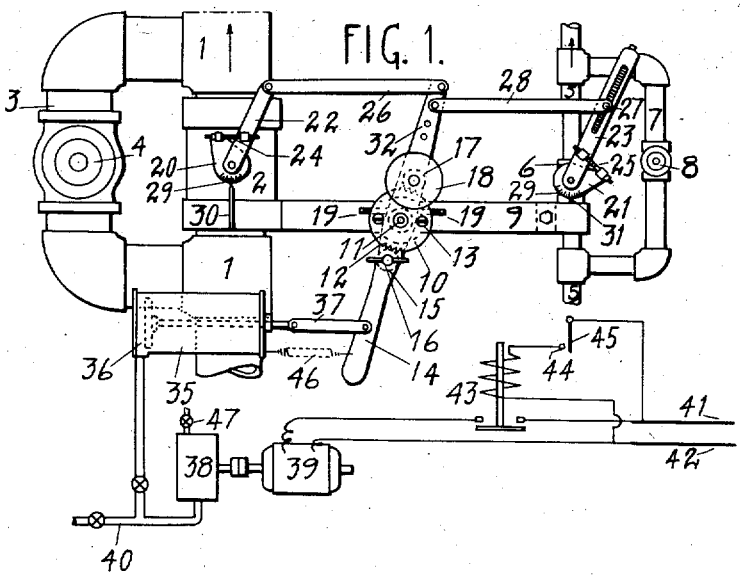
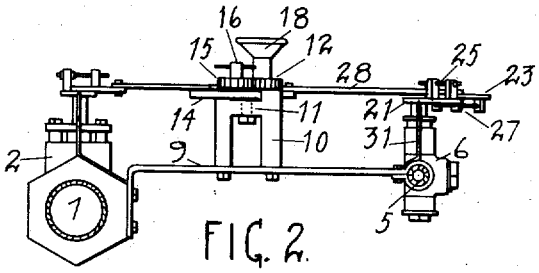
INVENTOR.
Christian Wilhjelm
BY
Frank H. Borden
ATTORNEY.

VALVE REGULATING DEVICE

Original Filed March 16, 1929 2 Sheets-Sheet 2

INVENTOR.
Christian Wilhjelm
BY
Frank H. Borden
ATTORNEY.

Reissued Sept. 4, 1934

Re. 19,308

UNITED STATES PATENT OFFICE 19,308

VALVE REGULATING DEVICE

Christian Wilhjelm, Philadelphia, Pa., assignor, by mesne assignments, to Automatic Temperature Control Co., Inc., Philadelphia, Pa., a corporation of Pennsylvania Original No. 1,844,415, dated February 9, 1932, Serial No. 347,530, March 16, 1929. Application for reissue October 3, 1933, Serial No. 636,075

4 Claims. (Cl. 236—84)

Figure 3:
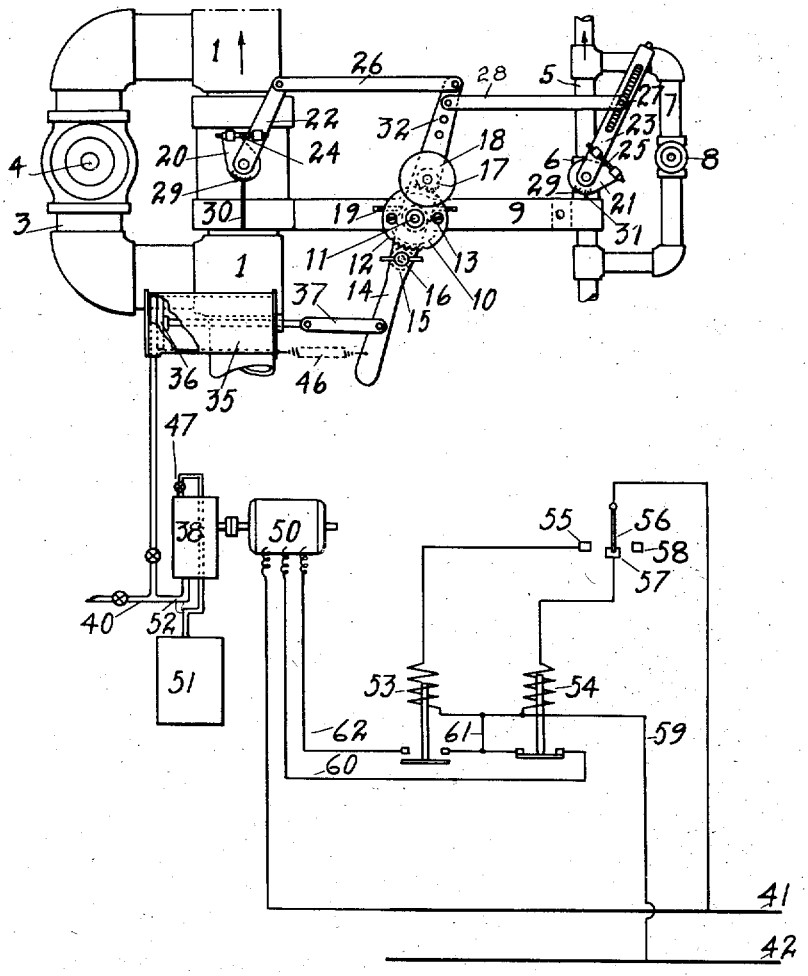

This invention relates to improvements in apparatus for regulating the fuel supply control valves on furnaces using gas and air, or oil and air, as a fuel, in which cases it is of great importance that the air supply be always properly proportioned to the fuel supply in order to maintain constantly a given temperature in the combustion chamber of the furnace.

One object of the invention is to provide a valve regulating apparatus of simple and practical construction including novel features of control, operation and adjustment. Another object is to include in the apparatus automatic electrically actuated means for operating the valves in response to temperature changes.

Still another object of the invention is to provide means for maintaining the proportionate supply of air and fuel throughout a wide range of movements of the valves. Other objects of the invention and the advantages thereof will appear as this specification proceeds, while reference is had to the accompanying drawings in which Figure 1 is a plan view illustrating a valve control apparatus embodying the invention together with an electric wiring diagram for causing the operation of the valves, Figure 2 is a view in elevation of the apparatus with parts broken away and parts omitted, and Figure 3 is a plan view illustrating a valve control apparatus embodying the invention together with an electric wiring diagram of a modification for causing the operation of the valves.

In the drawings the reference numeral 1 denotes an air pipe for supplying a furnace, not shown, with air, the admission of which is controlled by an air valve 2. 3 is an air by-pass having a valve 4. 5 denotes an oil pipe for supplying oil to the furnace and is provided with an oil valve 6. 7 is the oil by-pass controlled by a valve 8.

The supply pipes are usually located near each other so that the control apparatus may be conveniently placed on a support 9 which in this instance is in the nature of a strap or bracket extending from one pipe to the other pipe. The exact form of the support of the apparatus, its location, mounting thereof and the like, all depend upon how the pipes are arranged and upon local conditions, as will be understood.

To the bracket 9 there is secured a base 10 which carries a stud 11. A main gear 12 fits over the stud and is secured to the base by two screws 13 so the gear cannot turn. On the stud 11 is further pivoted a handle 14 which carries a locking pinion 15 in mesh with the gear. The pinion may be locked against rotation by a nut 16. Diametrically opposite the pinion 15 the handle 14 carries another similar pinion 17 also in mesh with the gear 12. The pinion 17 may be rotated individually by a handwheel 18. The movements of the handle 14 may be limited by two adjusting screws 19, 19 which are screwed into the base in the plane of the handle.

Each of the two valves 2 and 6 are operable by means of a valve arm 20 and 21 respectively. Each valve arm is adjustably held in operative relation to valve levers, 22 and 23 respectively, by suitable adjustable connecting means at 24 and at 25.

The air valve lever 22 is connected to the handle 14 by a link 26. The oil valve lever 23 carries an adjustable pivot 27 connected by a link 28 to the handle 14. The valve arms each carry a scale 29 cooperating with fixed pointer 30 and 31 respectively for purposes of adjustment and setting of the valves.

In operation each valve setting is adjusted by operation of the adjusting means 24 and 25 between the valve arms and the valve levers, and the ratio of movement of the two valves is adjusted by moving the floating pivot 27 on valve lever 23, and the two links 26 and 28 may be adjusted by connecting them to the different holes 32 in the handle 14. By means of these adjustments the valves may be operated to supply the furnace with the correct fuel mixture necessary to maintain a given temperature. The furnace may be started by opening the by-pass valves until the desired temperature is reached.

The extreme limits of movements of the valves in either direction is controlled by means of the two limiting screws 19, so that when the temperature is to be increased or decreased, the operator simply throws the handle 14 from one position to the other and in either case the proportionate valve settings are not disturbed. Variations in temperature may be compensated for by moving the handle one way or the other. During such movements the two pinions rotate on the gear. Minute adjustments are obtained by turning the handwheel 18 to cause the pinion 17 to turn on the gear 13 to move the handle. The mechanism may be locked in any position by screwing down the nut 16 whereby to lock the pinion 15 against rotation and the handle will then remain locked in any desired position.

The apparatus is adapted for automatic operation which is of particular advantage when several pairs of supply pipes are located at different points to supply fuel to burners which are located some distance apart. In such case it is of course of importance that all the burners be controlled at one time.

Referring to the diagram in connection with Figure 1, the reference numeral 35 denotes an air cylinder having a piston 36 connected to the handle 14 by a link 37. Air under pressure is supplied to the cylinder from a rotary pump 38 driven from an electric motor 39. By means of one or more branch pipes 40 pressure may be supplied to other cylinders for similar purposes in the same installation. The motor is connected to the line wires 41 and 42 and the current supply is opened or closed by a relay 43. One side of the latter is connected to the line 42, the other side is connected to a contact 44 adapted to be engaged by an element 45 which is connected to the other line 41.

The element 45 represents diagrammatically an element responsive to temperature changes in the furnace, such as a thermostat, thermometer, pyrometer or the like, which, when the temperature increases moves to contact with the contact 44 and closes the circuit through the relay 43 whereupon the motor starts to drive the pump and pressure is applied behind the piston 36 to actuate the handle 14 to close the valves. When the temperature returns to normal the circuit is broken and the pump stops. The pressure decreases by leakage to the pump and the handle 14 is moved back to normal position by a spring 46.

If the current supply should fail, the apparatus may be manually operated by disconnecting the spring 46 and opening a valve 47 to put the pump out of commission.

A circuit including a two speed motor may be used where it is desired to operate the valves automatically in response to low, normal or high temperatures within the furnace. The rotary pump 38 in Figure 3 is driven by a two speed motor 50 and pumps liquid from a tank 51 into the pipe 52 leading to the cylinder 35 as shown in Figure 1. One side of the motor is connected to the line 41, the other side is connected through either of relays 53 and 54 to the other line 42. The relay 53 is connected to the line and to the low contact 55 of a thermostat or like device 56. The other relay 54 is connected between the line and the normal contact 57 of the thermostat. 58 is the high contact.

The operation is as follows. When the temperature is normal, a circuit is closed through the relay 54 and thermostat contact 57 to energize the relay and close a slow speed circuit, as shown, from line 42 through wire 59, the relay contacts and wire 60 to the motor and out. The motor will then operate to drive the pump to put just sufficient pressure behind the piston 36 to keep the handle 14 in normal position.

If the temperature falls, the thermostat makes contact at 55 and relay 53 will be energized to close its contacts. The motor circuit at 54 will open and a new one established by way of wires 59 and 61, through the relay contacts and wire 62 to the motor and out. The motor will then run at high speed and more pressure will be put behind the piston 36 to move the handle 14 to high position to open the valves further.

If the temperature increases, the thermostat will make contact at 58 and break the motor circuit. The liquid in the cylinder 35 may then drain back into the tank 51. A gas or a liquid may be used for pressure purposes with either diagram in the drawings.

I claim:

1. A valve operating mechanism of the character described comprising in combination two valves, operating connections therefor, an operating handle, adjustable means between the latter and the said operating connections for maintaining a given ratio of operations of the two valves irrespective of the movements thereof, a fixed gear, a pinion on said handle in mesh with the gear, a hand wheel for operating said pinion for fine adjustment purposes of the handle, a second pinion on said handle in mesh with the gear and means for locking said pinion against movement to maintain the handle in any fixed adjusted position.

2. The combination of a pair of valves for controlling the fuel supply to a furnace, operating connections for said valves, handle for actuating said connections, a pressure cylinder, a piston therein connected to said handle, an electric circuit, means in the latter operative in response to the temperature changes in said furnace for generating and applying liquid pressure to the said cylinder when the temperature in the furnace is normal or lower than normal, means in the circuit for breaking the latter when the temperature is higher than normal and a tank draining said pressure cylinder when the circuit is broken.

3. In a temperature control system, a valve for controlling the fuel supply to a furnace, means for operating the valve, a normally closed electric circuit including means for applying pressure to the valve operating means to maintain the valve in a normally open position at normal temperature conditions within the furnace, other means in said circuit for operating the same to increase the pressure to open the valve still further when the temperature decreases, means in the circuit for breaking the same when the temperature exceeds normal, a tank for draining the pressure applying means when the circuit is broken and a spring for returning the valve to normal operating position when the circuit is broken.

4. In an automatic valve control system, a fluid pressure system arranged to furnish fluid pressure selectively at high, medium and atmospheric pressures, a fluid motor in the said system, a valve operatively coupled to the motor, an electrical control system operatively associated with the fluid system, a temperature responsive device having a normal mid-position and operatively associated with the electrical and fluid systems to furnish medium pressure on said motor to establish a valve setting, said responsive device arranged selectively to vary the fluid pressure effective on the motor upon deviations from the normal mid-position to selectively establish an extreme valve setting, and arranged to return to the medium pressure when the responsive means returns to said normal mid-position to return the valve to a setting spaced from the extreme settings.

CHRISTIAN WILHJELM.